June 13, 1972  M. S. MILLER  3,669,592
INJECTION MOLDING MACHINES
Filed April 28, 1970  5 Sheets-Sheet 1
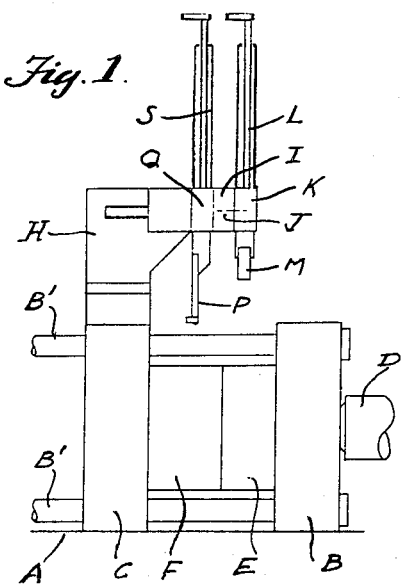
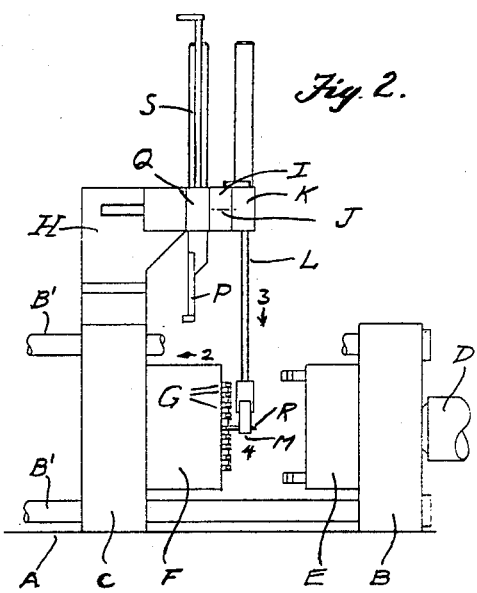
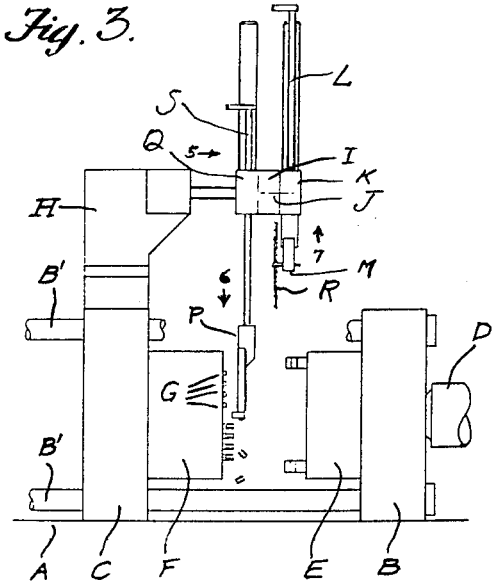
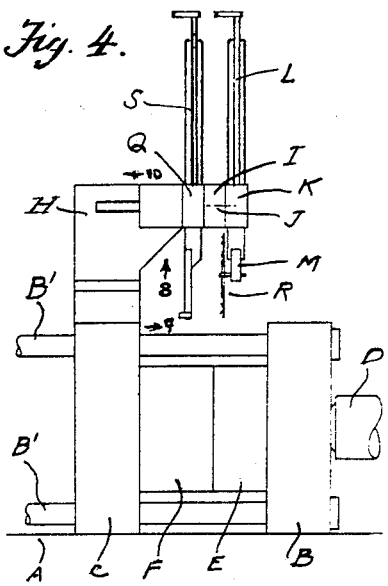
INVENTOR
MANUEL S. MILLER,
BY Hall + Houghton
ATTORNEY

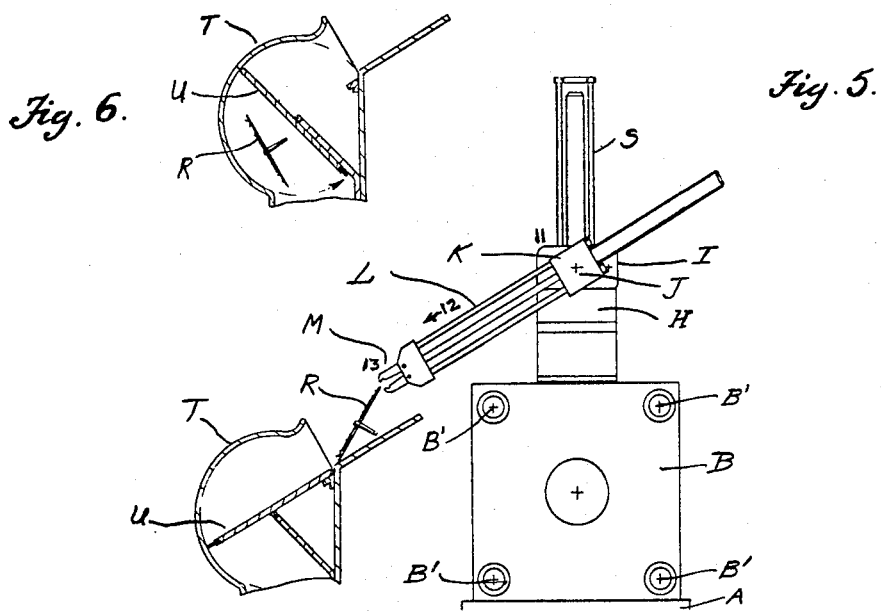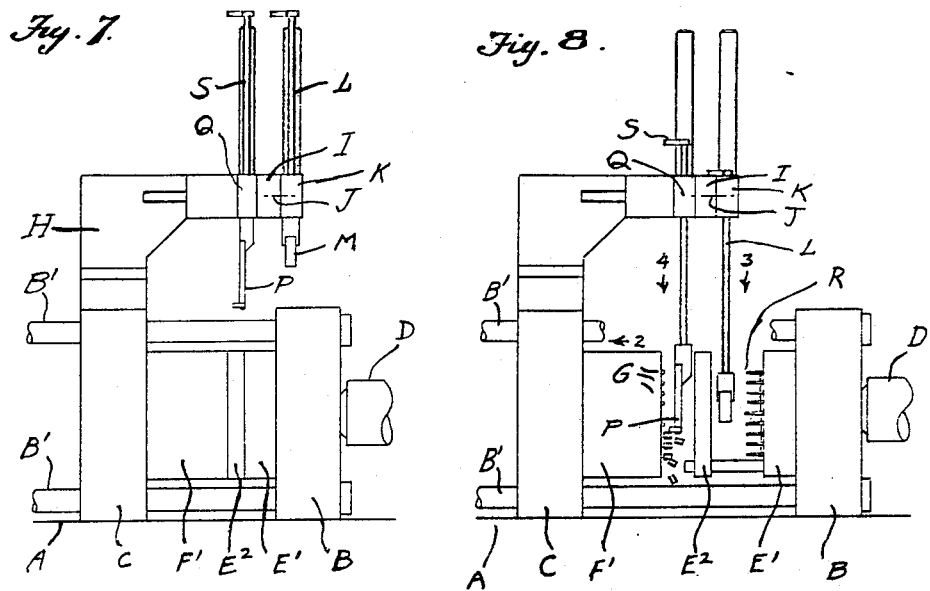

INVENTOR

MANUEL S. MILLER.

BY Hall + Houghton

ATTORNEY

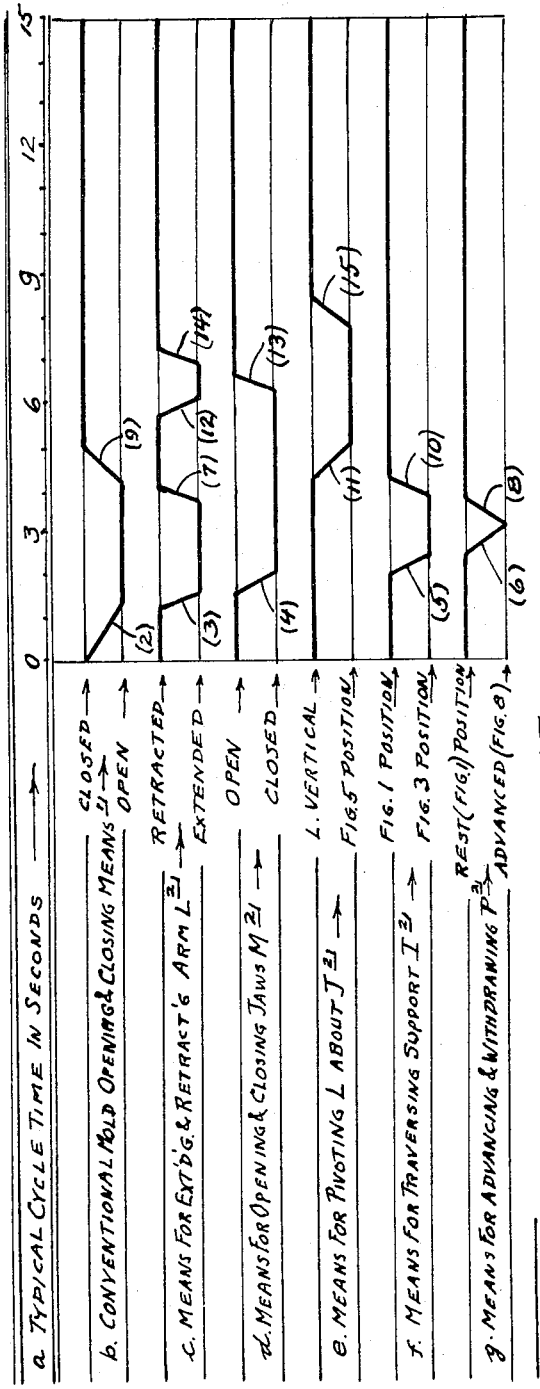

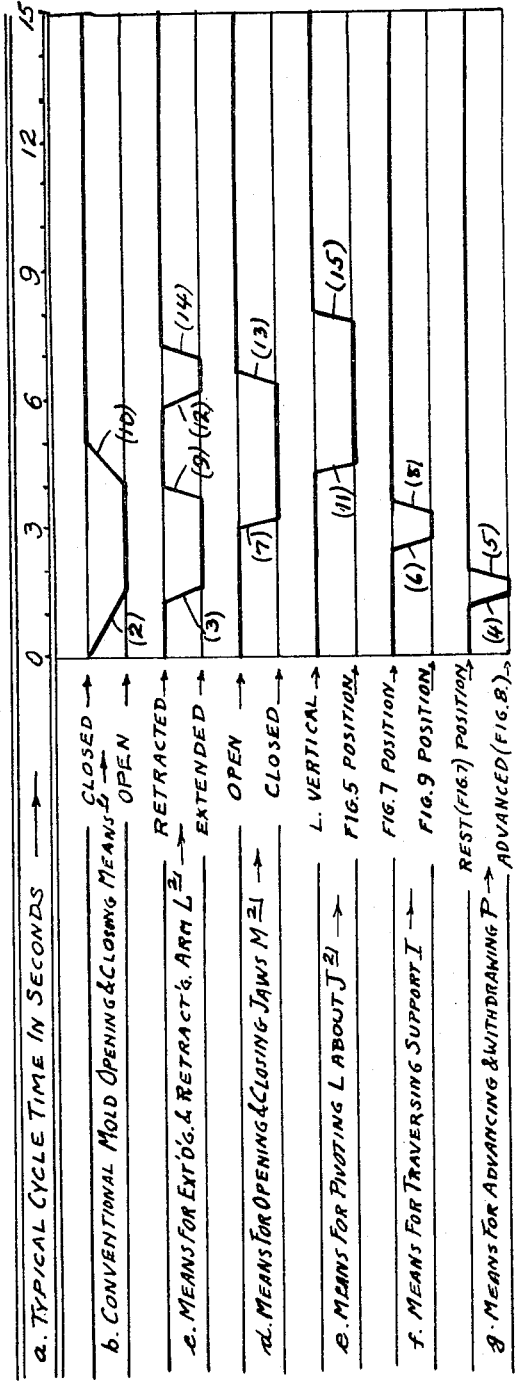

United States Patent Office 3,669,592
Patented June 13, 1972

3,669,592
INJECTION MOLDING MACHINES
Manuel S. Miller, Bethel, Vt., assignor to G-W Plastic Engineers, Inc., Bethel, Vt.
Filed Apr. 28, 1970, Ser. No. 32,567
Int. Cl. B29c 7/00; B29f 1/14
U.S. Cl. 425—155    4 Claims

ABSTRACT OF THE DISCLOSURE

Mechanism is provided for removing the runner and sprue assembly from the mold to a point of disposal apart from the work, in timed relation to the molding cycle, preferably in a unitary combination with a knock-off device carried with such mechanism on a common traversable support, and particularly, but not exclusively, adapted for operation with submarine gated or back gated molds.

BACKGROUND OF THE INVENTION

(1) Field of the invention

This invention relates to the field of injection molding machines, and more particularly to means for separately removing the runners and work pieces from said machines

(2) Prior state of the art

In the art of multicavity or family cavity (herein generically termed multiple cavity) injection molding as practiced prior to the present invention, after an injection molding operation the molds were opened and both the multiple work pieces and the runner were discharged from the mold to a common delivery chute, steps being thereafter taken to separate the work pieces from the runner and sprue scrap. Especially when these operations have resulted in breaking of such scrap into pieces approximating the size of the molded parts, further operations for separating the same have been time and labor consuming.

SUMMARY OF THE INVENTION

The present invention aims to provide means for reducing the problems incident to such prior practices, and to this end provides, in combination with a multiple cavity molding machine, means for separately removing such scrap and the work from the mold comprising a runner extractor, operable in conjunction with the ejector pins, and with a sweep device, the runner extractor grasping the runner, preferably by its sprue or cold well extension, and lifting it from the mold as a unit separate and apart from the work pieces without subjecting it to dropping or impact from the sweep device, and bodily delivering the so lifted runner and sprue scrap to a disposal and reclaim system, e.g. a grinder valve and grinder, thereby reducing or eliminating the delivery with the work pieces of broken pieces of runner comparable in size to the work pieces and hence difficult to separate therefrom. The in-invention further aims to provide simple and effective means for effecting such operations.

The invention resides in the means and mechanisms for accomplishing these ends and is more particularly pointed out in the appended claims.

BRIEF DESCRIPTION OF THE DRAWINGS

In the accompanying drawings illustrating preferred embodiments of the invention:

FIGS. 1 to 6 are diagrams illustrating the arrangement and operation of a plastics molding machine equipped with a first embodiment of the invention, FIGS. 1 to 4 being partial side elevational diagrams, FIG. 5 a front elevational diagram partly in section, and FIG. 6 a detail diagram of the sectionalized part of FIG. 5 in another position; and FIG. 12 is its operating means and chart.

FIGS. 7 to 11 are similar side elevational diagrams illustrating the arrangement and operation of a second embodiment, with reference to which FIGS. 5 and 6 are also illustrative, and FIG. 13 is its operating means and chart.

DETAILED DESCRIPTION

Figure 9:
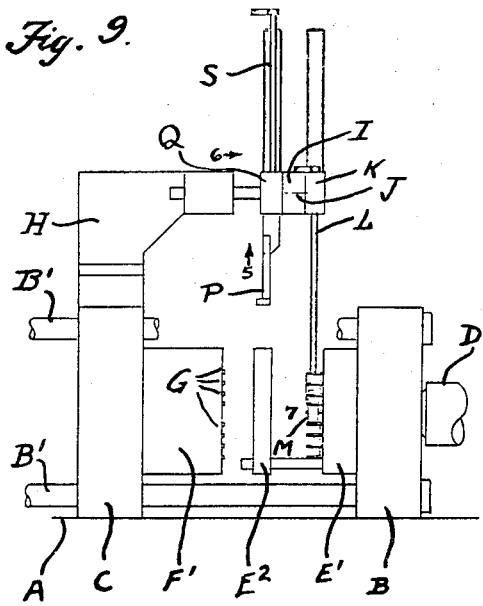

Referring to FIGS. 1 to 6, in the embodiment therein illustrated the injection molding machine is equipped with a multiple cavity gated mold (shown as of the submarine gated type) and comprises a frame A having mounted thereon a fixedly positioned front platen B, guide bars B', and a back platen C movable longitudinally thereon relative to the front platen by conventional mold or press opening and closing means which may be of the hydraulic ram, toggle mechanism, or any other suitable type (not shown). Associated with the fixedly positioned front platen B in a plastics injector D of conventional or other suitable form, and the front block of the mold E. Carried by the longitudinally movable back platen C is the remainder F of the mold shown as comprising the main portions of the mold cavities and runner grooves with the restricted gates leading therefrom to the cavities, and as provided with work ejector means of conventional form comprising the ejector pins G (FIGS. 2 and 3). As is illustrated by the showing in FIG. 2 of the sprue and runner R molded therein, the runner and gate defining portions of the mold E and F are apertured and grooved to provide the sprue opening from injection D through portion E, the gates at or proximate to the parting line of the mold sections E and F to feed injected plastics to the several mold cavities, and runner grooves at the parting line or interface between the portions E and F, principally formed in the face of portion F and connecting the sprue to the gates of the mold. With this arrangement, as will be understood by one skilled in the art, with the mold closed as shown in FIG. 1, the plastics material is injected by injector D through the sprue opening in the sprue bushing, and thence through the runner grooves and the gates to fill the multiple cavity mold E–F; the injection is then terminated; the mold is then opened, which operation, by means of the usual sprue lock (not shown) withdraws the sprue from the mold portion E as the portion F moves the work and the scrap (runners and sprue) away from the mold portion E; and the work ejector means G is operated in the usual manner to break the gates and eject the work from the mold portion F to the position shown in FIG. 2. In conventional molding machines, at this point the ejected work and scrap drops, either by gravity, or with other assistance, into the delivery chute as above mentioned.

In accordance with the illustrated embodiment of this invention, however, there is mounted adjacent to the mold, e.g. on the front or back platen B or C or elsewhere, mechanism for removing the sprue and runner assembly separately from the workpieces, said mechanism comprising, in combination, a frame H adapted to be secured to the molding machine and having a support I traversable parallel to the direction of opening and closing of the mold, a shaft J carried by said support I and having its axis extending parallel to the direction of traverse of said support, a guide block secured on its shaft and rotatable about said axis, an extensible arm L mounted on said guide block for movement relative thereto to extended and retracted positions, openable and closable jaws M (best shown in FIG. 5) carried by said arm L and operating in a plane normal to the direction of traverse of said support L for closing on the sprue and runner R formed in said mold while still supported therein, and an operating means (FIG. 12) comprising portions (c) connected to said extensible arm, (d) to said jaws, (e) to said guide block, and (f) to said traversable support, and synchronized with the opening and closing of said mold block assemblies to cause said jaw means to advance between said mold block assemblies when separated and grasp the runner and sprue assembly therein, to then traverse said support to free the runner and sprue assembly from the mold, to then retract the jaws and the assembly carried thereby from between the mold faces before the closing of the mold, to the rotate said guide blocks K to orient said arm L to extend outside the molding machine when advanced and to the advance said arm L to position said jaws M laterally of said machine in a disposal position, to open said jaws to release said assembly at said disposal position, and to cause said support and arm to then assume their initial positions after such release ready to repeat the cycle.

In more detail, the operating means (FIG. 12) operates the several elements of FIGS. 1 to 6 in the order indicated by numbered arrows in those figures and by the same numbers applied, in parentheses, to the transition portions of the typical cycle time chart in FIG. 12, viz: the molding machine—which has a multiple cavity mold formed by the set of mold block assemblies E and F having parting faces defining the mold cavities and the runner and sprue cavities of the mold and separate along their parting faces in opening the mold, as shown—has a timer means $b$ which opens the mold (2), then the cylinder $c$ connected to the arm L is operated to extend the same (3) to a position at which the jaws M embrace the sprue, whereupon the cylinder $d$ closes the jaws (4) and cylinder $f$ traverses the support I to its FIG. 3 position (5). While the parts are in this traverse position, the operations (6), (7), and (8) are effected to advance and retract the knock-off means P and retract the arm L before the means $b$ recloses the mold (9) as shown in FIG. 4. As shown in FIGS. 5 and 12, the means $e$ then pivots the arm L as indicated at (11), from its original vertical position to orient it to extend outside the molding machine when advanced, and the means $c$ extends the said arm to move the jaws M to the position of disposal (12) shown as the mouth of the grinder hopper T located laterally outside the guide bars B′ (FIG. 5). The means $d$ then opens the jaws (13) and the runner assembly then falls onto the grinder gate U which tilts as shown in FIG. 6, to deliver the runner assembly to the grinder (not shown). After the operation (13), as indicated in FIG. 12, the means $c$ again retracts the arm (14) and the means $e$ pivots it to its original vertical position, ready to restart the cycle in due course when the mold is again opened. Auxiliary operations, such as brushing of the parting face of the mold block assembly G and the application e.g. spraying, of mold release agent thereon, may be effected concurrently with the knock-off operation, and of course as soon as the mold is closed (9), the next charge is injected by injector D so that solidification of the plastic may occur in the mold cavities by the end of the cycle time (FIG. 12).

As is illustrated in the drawings, the knock-off device P is also carried by the traversable support I and comprises a guiding block Q secured on said traversable support I and an extendable and retractable arm S mounted on said guiding block, and as above mentioned the operating means $g$ (FIG. 12) is connected to the arm S and synchronized with the operating means $b$ to $f$ to cause the knock-off device P to move between the molding cavity defining parting faces of the mold blocks, in timed relation to the traversing of the support L to free the runner and sprue assembly R from the mold, to insure dislodging of the workpieces freed from the mold cavities by the work ejector means G, and to then retract the knock-off device before closing of the mold.

In the form shown in FIGS. 1 to 6, the mold is a submarine gated mold, and when the ejector means G has broken the restricted gates the runner and sprue assembly is retained or supported in the mold by the portions of the runners leading to such gates until the jaws M are closed and the assembly is pulled free by the traversing operation (5). As will be understood by those skilled in the art, however, the invention in its broader aspects is not limited to such form of mold, and the runner assembly may be supported within the opened mold by other means, e.g. an undercut in a cold-shot well. In addition the invention is adaptable for machines in which the mold is of the back gated type, as exemplified in connection with FIGS. 7 to 11 ( and FIGS. 5, 6, and 13) which will now be described.

Figure 10:
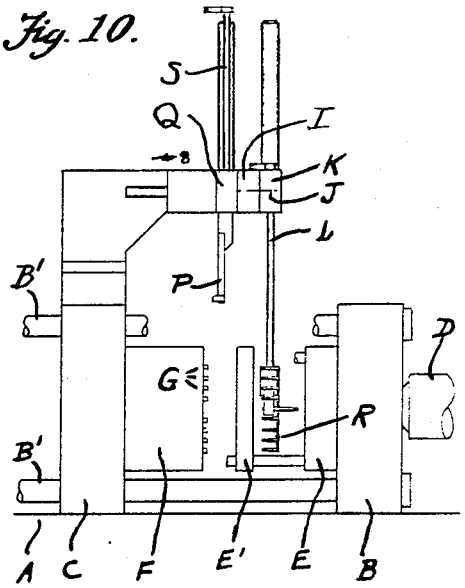
Figure 11:
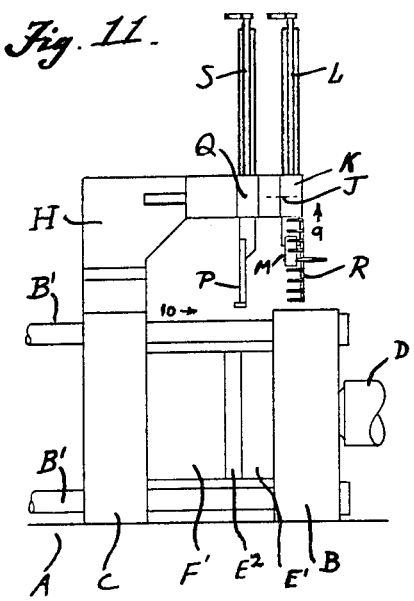

In the embodiment of FIGS. 7-11 the elements A to D, G to M, and P to T are substantially the same as the corresponding elements of FIGS. 1-6 and hence need no further description. The mold in FIGS. 1-6 is a submarine gated mold made up of a set of two mold block assemblies E and F with opposed parting faces defining the mold cavities and the runner and sprue cavities of the mold. The mold in the embodiment of FIGS. 7–10 is a back gated mold made up of a set of three mold block assemblies E′, $E^2$ and F′ with opposed parting faces on the first and second assemblies $E^1$, $E^2$ defining the runner and sprue cavities, and opposed parting faces on the second and third assemblies $E^2$, $F^1$ defining the work cavities of the mold. With this type of mold, the mold opening mechanism $b$ separates the three mold block assemblies, preferably concurrently, along their parting faces, for opening the mold, as shown in FIGS. 8, 9 and 10, and this separation preferably breaks the restricted gates at the parting faces between the second and third mold block assemblies $E^2$ and $F^1$ and leaves the runner and sprue assembly supported by the first mold block assembly $E^1$ (see FIGS. 8 and 9).

With this arrangement, the operating means $c$ and $f$ (FIG. 13) are preferably timed to extend arm L and cause the jaw means M to move between the runner and sprue cavity defining faces of the mold when opened as shown at (3), FIGS. 8 and 13, and to then traverse therebetween toward the mold block supporting the runner and sprue assembly, as shown at (6) FIGS. 9 and 13, and then, after operation of the means (d) to close the jaws M, shown at (7) in FIGS. 9 and 13, away from said supporting mold block E′ to free the runner and sprue assembly R therefrom as shown at (8) in FIG. 10 and FIG. 13.

Also in this embodiment the operating means (g) FIG. 13, is timed to cause the knock-off device P to move between the second and third mold blocks $E^2$ and F′ after opening of the mold and to retract from therebetween—operations (4) and (5) FIGS. 8, 9 and 13—before the traversing operation (6). Otherwise the timing, FIG. 13, is substantially as in the embodiment of FIG. 12.

While there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. Mechanism for removing the sprue and runner assembly from an injection molding machine having a multiple cavity mold formed by a set of mold block assemblies having parting faces defining the mold cavities and the runner and sprue cavities of the mold and being separable along their parting faces in opening of the mold, said mechanism comprising, in combination:

(a) a frame adapted to be secured to the molding machine and having a support traversable parallel to the direction of opening and closing of the mold, (b) a shaft carried by said support above the molding machine, having its axis extending parallel to the direction of traverse of said support, (c) a guide block secured on said shaft and rockable about said axis, (d) an extensible arm mounted in said guide block for movement relative thereto to extended and retracted positions, (e) openable and closeable jaws carried by said arm and operating in a plane at right angles to the direction of traverse of said support for closing on the sprue and runner formed in said mold while still supported therein, and (f) an operating means connected to said traversable support, to said guide block, to said extensible arm, and to said jaws, and synchronized with the separation of said mold block assemblies to cause said jaw means to advance between the parting faces of said mold block assemblies when separated and grasp the runner and sprue assembly therein, to then traverse said support to free the runner and sprue assembly from the mold, to then retract the jaws and the assembly carried thereby from between the mold faces before the closing of the mold, to then rock said guide block to orient said arm in a direction to advance outside the molding machine when advanced and to advance said arm to position said jaws at a disposal position laterally of the molding machine and to open said jaws thereat to release said assembly at said disposal position, and to cause said support and arm to then move to their initial positions after such release.

2. Mechanism as claimed in claim 1, wherein the mold is a submarine-gated mold having ejector means and means (f) operates the extensible arm and jaws to grasp the sprue portion of the runner after the breaking of the submarine gates by the operation of the ejector means.

3. Mechanism as claimed in claim 1, wherein (g) the mold is a back gated mold and the set of mold block assemblies comprises first, second and third mold block assemblies, with opposed parting faces on the first and second assemblies defining the runner and sprue cavities, and opposed parting faces on the second and third assemblies defining the work cavities of the mold; and (h) the said operating means (f) causes the jaw means to move between the runner and sprue cavity defining faces of the mold when opened, and to then traverse therebetween toward the mold block supporting the runner and sprue assembly and then, after grasping said runner and sprue assembly, away from said supporting mold block to free the same therefrom.

4. Mechanism for removing the sprue and runner assembly from an injection molding machine having a multiple cavity mold formed by a set of mold block assemblies having parting faces defining the mold cavities and the runner and sprue cavities of the mold and being separable along their parting faces in opening of the mold, said mechanism comprising, in combination:

(a) a frame adapted to be secured to the molding machine and having a support traversable parallel to the direction of opening and closing of the mold, (b) a shaft carried by said support, having its axis extending parallel to the direction of traverse of said support, (c) a guide block secured on said shaft and rockable about said axis, (d) an extensible arm mounted in said guide block for movement relative thereto to extended and retracted positions, (e) operable and closeable jaws carried by said arm and operating in a plane at right angles to the direction of traverse of said support for closing on the sprue and runner formed in said mold while still support therein, and (f) an operating means connected to said traversable support, to said guide block, to said extensible arm, and to said jaws, and synchronized with the separation of said mold block assemblies to cause said jaw means to move between the parting faces of said mold block assemblies when separated and grasp the runner and sprue assembly therein, to then traverse said support to free the runner and sprue assembly from the mold, to then move the jaws and the assembly carried thereby from between the mold faces before the closing of the mold and then to a disposal position, to open said jaws to release said assembly at said disposal position, and to cause said support and arm to then move to their initial positions after such release, the molding machine comprising work ejector means, and said mechanism further comprising:

(g) a knock-off device also carried by said traversable support, said knock-off device comprising a guiding block secured on said traversable support and an extendable and retractable arm mounted on said guiding block, and (h) operating means connected to said extendable and retractable arm and synchronized with the operating means (f) to cause said knock-off device to move between the molding cavity defining parting faces of said mold blocks in timed relation to the traversing of said support to free the runner and sprue assembly from the mold, to insure dislodging of the workpieces free from the mold cavities by said work ejector means, and to then retract said knock-off device before closing of the mold, and wherein (i) the mold is a back gated mold and the set of mold block assemblies comprises first, second and third mold block assemblies, with opposed parting faces on the first and second assemblies defining the runner and sprue cavities, and opposed parting faces on the second and third assemblies defining the work cavities of the mold, (j) the said operating means (f) causes the jaw means to move between the runner and sprue cavity defining faces of the mold when opened, and to then traverse therebetween toward the mold block supporting the runner and sprue assembly and then, after grasping said runner and sprue assembly, away from said supporting mold block to free the same therefrom, and (k) said operating means (h) causes said knock-off device to move between the second and third mold blocks after opening of the mold and to retract from therebetween before the traversing of said support.

References Cited

UNITED STATES PATENTS

| 3,224,040 | 12/1965 | Bridges et al. | 18—2 RM X |
|---|---|---|---|
| 3,208,113 | 9/1965 | Bennett | 18—Dig 51 |
| 2,675,583 | 4/1954 | Scherry | 18—2 RP X |
| 2,743,478 | 5/1956 | Harlow et al. | 18—Dig 18 |
| 3,081,486 | 3/1963 | Skvorc | 18—2 RP |
| 3,197,811 | 8/1965 | Workman | 18—2 RM X |

FOREIGN PATENTS

| 1,275,276 | 8/1968 | Germany | 18—Dig 51 |
|---|---|---|---|

J. SPENCER OVERHOLSER, Primary Examiner

M. O. SUTTON, Assistant Examiner

U.S. Cl. X.R.

425—168, 217, 289, 250, 441